Dec. 14, 1926.
L. A. RAWSON
1,610,588
TUG WHEEL RIM
Filed Oct. 10, 1923
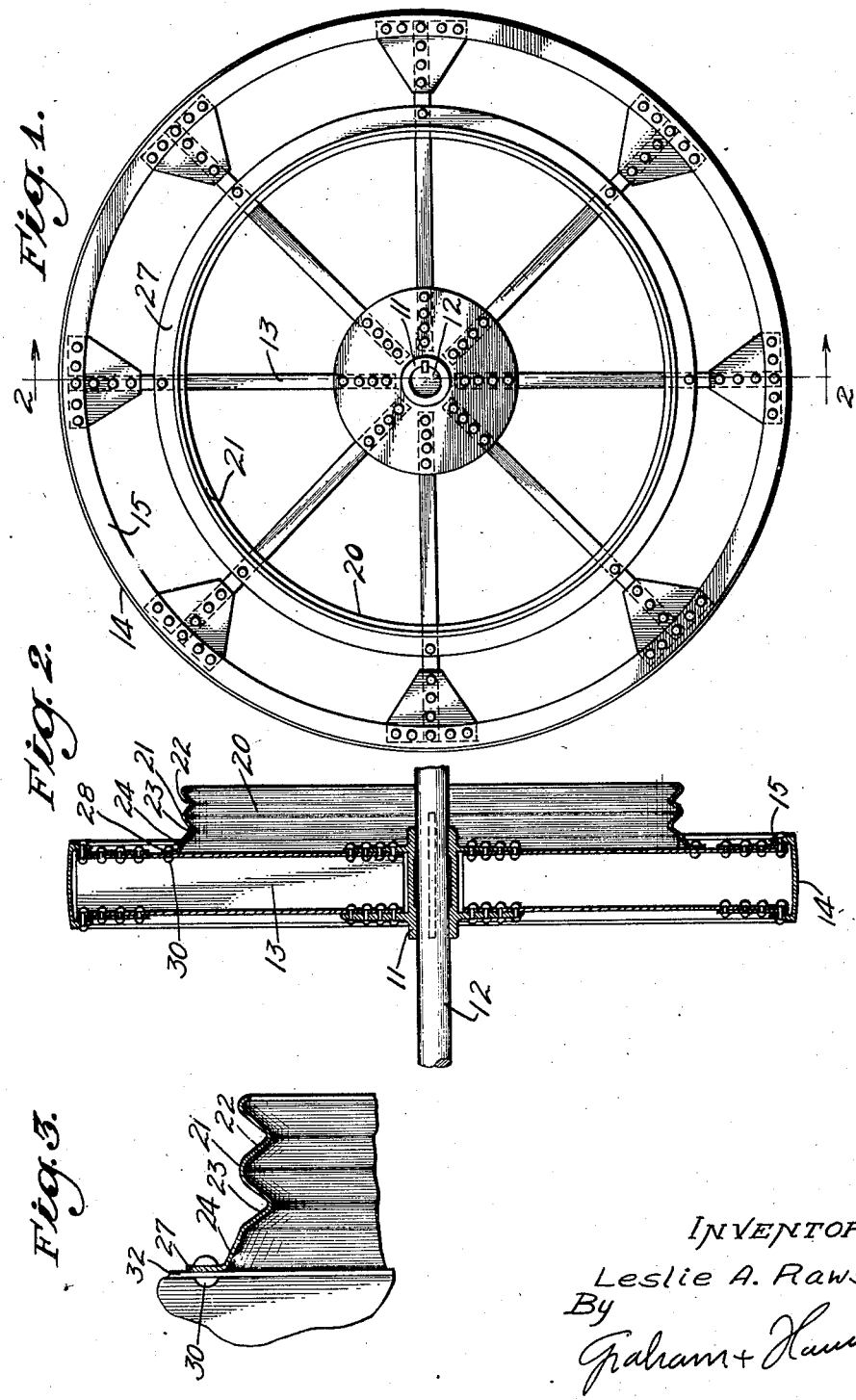
INVENTOR:
Leslie A. Rawson,
By
ATTORNEYS.

Patented Dec. 14, 1926.

1,610,588

UNITED STATES PATENT OFFICE.

LESLIE A. RAWSON, OF VENICE, CALIFORNIA, ASSIGNOR TO EMSCO DERRICK & EQUIPMENT COMPANY, A CORPORATION OF CALIFORNIA.

TUG-WHEEL RIM.

Application filed October 10, 1923. Serial No. 667,640.

This invention relates to equipment in the oil producing industry and relates particularly to a tug wheel rim suitable for employment on the band wheel of an oil rig.

For the purpose of driving the bull wheel and the calf wheel, a tug wheel is mounted on one side of the band wheel from which power is received from the engine through a belt. Such tug wheels are generally constructed of wood blocks or cants bolted upon the sides of the band wheel and, due to the lack of permanence of wood, must be replaced at intervals.

It is an object of the invention to provide a tug wheel of a durable material such as steel which will be of simple and rigid form and may be quickly attached to a band wheel.

The especial advantages and further objects of the invention will be made evident hereinafter.

Referring to the drawing which is for illustrative purposes only:

Fig. 1 is an elevation showing a tug wheel rim secured to a band wheel.

Fig. 2 is a section taken substantially as indicated by the line 2—2 of Fig. 1.

Fig. 3 is an enlarged fragmentary section through the tug wheel rim.

In this presentation of the invention, the tug wheel rim is shown mounted upon a steel band wheel. It will be readily understood that the use thereof with band wheels constructed of wood is also advantageous. The band wheel shown in the drawing comprises a hub 11 arranged to fit a shaft 12. Outwardly extending from the hub are spokes 13 consisting of a structural channel. Supported at the outer ends of the spokes 13 is a band or rim 14 consisting of a channel member rolled, with the flanges 15 thereof inwardly extending to the annular form shown.

The tug wheel indicated at 20 consists of a cylindrical shell comprised of a channel portion 21 having annular rope channels 22 and 23, a clearance section consisting of a conically formed web 24 constructed integrally with the sheave portion 21 and an outwardly radially extending flange 27 provided with holes 28 whereby the rim 20 may be secured to the band wheel by suitable means such as rivets 30 which extend through flanges 32 of the channels 13.

The member 20 is formed by a sheet of plate metal to the specific contour and cylindrical form shown in Figs. 2 and 3, and welding or riveting the ends of the plate together so that a continuous cylindrical member is formed.

By this method of construction, a tug wheel rim is formed from a single piece of metal and is of such shape that it will have ample strength to withstand the stresses placed therein in service. It will be recognized that the durability of a rim constructed in this manner is very pronounced and being so constructed, the rim should endure through the full life of the band wheel on which it is employed.

An especially valuable feature of the invention consists of the conical clearance section 24 which extends between the rope channel 23 and the attachment flange 27. It will be seen that the use of the clearance section enables the placing of the flange 27 directly against the spokes of the wheel and thus prevents the rope from getting wedged between the tug wheel and the spokes and guides the rope into the channel 23, this guidance being accomplished by the conical formation of the clearance section.

I claim as my invention:

1. In a tug wheel, the combination of: a sheave portion cylindrically formed to provide a shell of sectional contour presenting channel sheave formations; a conical clearance section integrally formed with said sheave portion and expanding to a greater diameter than the maximum diameter of the sheave portion; and radially extending flange means formed at the side of said clearance section for attachment to the structure of a wheel.

2. In a tug wheel, the combination of: a sheave portion cylindrically formed to provide a shell of sectional contour presenting channel sheave formations; a conical clearance section integrally formed with said sheave portion and expanding to a greater diameter than the maximum dameter of the sheave portion; and a radially extending flange formed at the side of said clearance section for attachment to the spoke structure of a wheel.

3. In a tug wheel, the combination of: a cylindrical portion having annular channels formed therein; a conical clearance portion at one side of the cylindrical portion enlarged to a diameter substantially greater than the diameter of the cylindrical portion; and a radially extending flange formed at the side of said clearance portion for attachment to the body of a wheel.

4. In a tug wheel, the combination of: a cylindrical portion having annular channels formed therein; a conical clearance portion at one side of the cylindrical portion enlarged to a diameter substantially greater than the diameter of the cylindrical portion; and a radial flange extending outwardly from the enlarged side of said clearance portion for attachment to the body of a wheel.

In testimony whereof, I have hereunto set my hand at Los Angeles, California, this 4th day of October, 1923.

LESLIE A. RAWSON.